United States Patent
Heynssens

(10) Patent No.: US 7,195,106 B2
(45) Date of Patent: Mar. 27, 2007

(54) MOTORIZED PLATFORM FOR LIFTING OBJECTS

(75) Inventor: Robert Heynssens, Gladstone, MI (US)

(73) Assignee: Power Platforms, Inc., Apopka, FL (US)

( * ) Notice: Subject to any disclaimer, the term of this patent is extended or adjusted under 35 U.S.C. 154(b) by 611 days.

(21) Appl. No.: 10/457,960

(22) Filed: Jun. 10, 2003

(65) Prior Publication Data
US 2004/0156704 A1    Aug. 12, 2004

Related U.S. Application Data

(63) Continuation of application No. 10/350,496, filed on Jan. 24, 2003, now Pat. No. 6,666,643.

(51) Int. Cl.
*B60P 1/02* (2006.01)

(52) U.S. Cl. .................. 187/244; 187/259; 254/290

(58) Field of Classification Search ................ 254/2 C, 254/89 R, 278, 290; 187/213, 240, 244, 187/258, 259
See application file for complete search history.

(56) References Cited

U.S. PATENT DOCUMENTS

| | | | |
|---|---|---|---|
| 301,304 A * | 7/1884 | Teal ............................ 187/235 |
| 2,420,903 A | 5/1947 | Noble | |
| 2,702,678 A | 2/1955 | Flock, Jr. | |
| 2,957,582 A | 10/1960 | Lusk | |
| 2,972,394 A | 2/1961 | Grant | |
| 3,172,501 A * | 3/1965 | Ramer ........................ 187/244 |
| 3,180,450 A | 4/1965 | Crager et al. | |
| 3,576,233 A | 4/1971 | Thatcher | |
| 4,529,063 A * | 7/1985 | Kishi .......................... 187/244 |
| 4,531,614 A | 7/1985 | Naegeli | |
| 4,632,627 A * | 12/1986 | Swallows .................... 414/490 |
| 4,926,973 A | 5/1990 | Smith | |
| 5,131,503 A | 7/1992 | Billington, III et al. | |
| 5,862,884 A | 1/1999 | Smith | |
| 6,123,495 A | 9/2000 | Callahan et al. | |
| 6,253,878 B1 | 7/2001 | Wells | |
| 6,435,804 B1 | 8/2002 | Hutchins | |

* cited by examiner

*Primary Examiner*—James Keenan
(74) *Attorney, Agent, or Firm*—Quarles & Brady; George E. Haas

(57) ABSTRACT

A load lifting apparatus with base frame that has elements to engage a surface which supports the load lifting apparatus. A plurality of lift posts ate attached to and extend upward from the base frame. A load platform for supporting an object being lifted can be raised and lowered with respect to the base frame. The load platform includes a motor arrangement which rotationally drives a plurality of reels. A plurality of flexible ties are connected to the plurality of lift posts and wind onto and unwind gfrom plurality of reels.

21 Claims, 4 Drawing Sheets

MOTORIZED PLATFORM FOR LIFTING OBJECTS

CROSS-REFERENCE TO RELATED APPLICATIONS

This application is a continuation in part of U.S. patent application Ser. No. 10/350,496 filed on Jan. 24, 2003 now U.S Pat. No. 6,666,643.

STATEMENT REGARDING FEDERALLY SPONSORED RESEARCH OR DEVELOPMENT

Not Applicable

BACKGROUND OF THE INVENTION

1. Field of the Invention

The present invention relates to apparatus with platforms for lifting objects, and more particularly to such platforms that contain a mechanism driven by a motor to raise and lower the platform with respect to a base frame.

2. Description of the Related Art

Pickup trucks have a rear tail gate that tilts downward to permit loads to be placed onto a cargo bed for transport. Vans have rear doors which open to provide access to the cargo area so that objects can be placed into and removed from the van. Typically, one or more persons carry the load to and from the pickup truck or van. If the load is relatively heavy or cumbersome for people to carry, a forklift or other type of industrial truck is used to pick the load off the ground, raise it to the height of the cargo bed of the vehicle. The industrial truck can be utilized with the reverse process to unload the vehicle. However, there are often situations where an industrial truck is unavailable at the location where the pickup truck or van is to be loaded or unloaded. In addition, industrial trucks are relatively expensive especially for facilities where they are used infrequently.

Therefore, it is desirable to provide a simpler apparatus for lifting objects to the height of the cargo bed of a motor vehicle so that the objects can be transferred from the ground onto the cargo bed.

In other situations it also is desirable to raise a machine to a level at which a mechanic is able to conveniently perform repairs and maintenance. For example, garden tractors and motorcycles are often raised to workbench height to facilitate access in order to repair and service to various components.

SUMMARY OF THE INVENTION

A load lifting apparatus includes a base frame with elements that engage a surface which supports the load lifting apparatus. The preferred embodiment of the frame has four rails that form a rectangular frame with a center opening. A plurality of lift posts are attached to and extend upward from the base frame. A load platform is provided to support an object being lifted. The load platform has a motor arrangement, a plurality of reels, and a transmission couples the motor arrangement to the plurality of reels. A separate flexible tie is wound onto each reel and is connected to an upper section of one of the lift posts.

To raise the load platform, the motor arrangement is operated in one direction which winds the flexible ties further onto the reels thereby drawing the load platform upward toward the upper sections of a lift posts. To lower the load platform, the motor arrangement is operated in the opposite direction to unwind the flexible ties from the reels. In a fully lowered position, the load platform is received within the opening of the base frame and rests on the surface beneath the lifting apparatus.

Wheels may be provided on the base frame to facilitate moving the loaded or unloaded lifting apparatus.

In the preferred embodiment of this apparatus, the load platform has a first shaft extending along the one side and a second shaft extending along an opposite side. Some of the reels are attached to each of those shafts. The a motor arrangement includes a first electric motor connected to drive the first shaft and a second electric motor connected to drive the second shaft. A separate sprocket is attached to each shaft and a chain engages the sprockets.

DETAILED DESCRIPTION OF THE INVENTION

Figure 1:
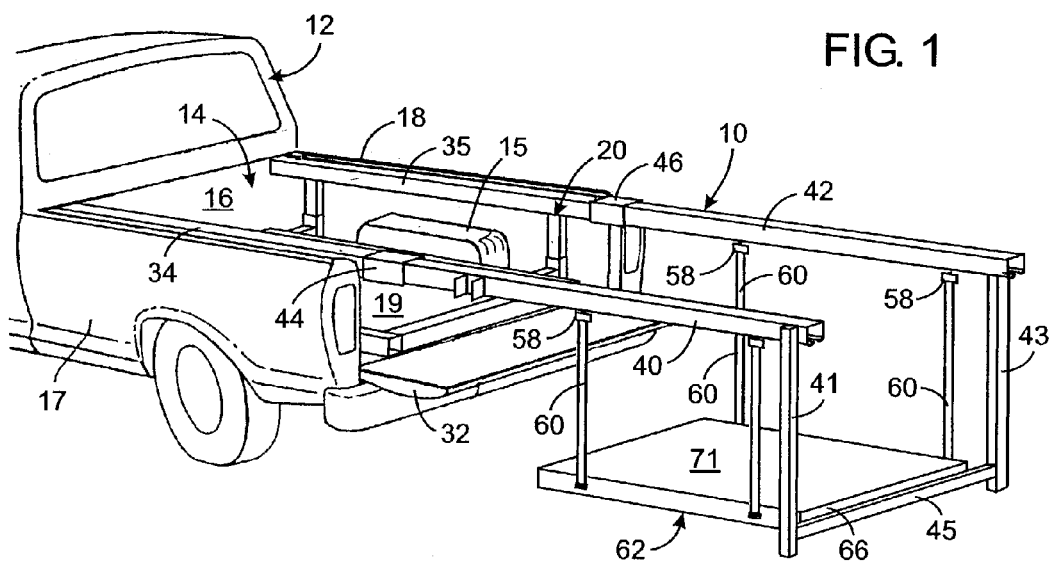
FIG. 1 is a fragmented perspective view of a motor vehicle on which the main frame of a load lifting apparatus has been installed.
Figure 2:
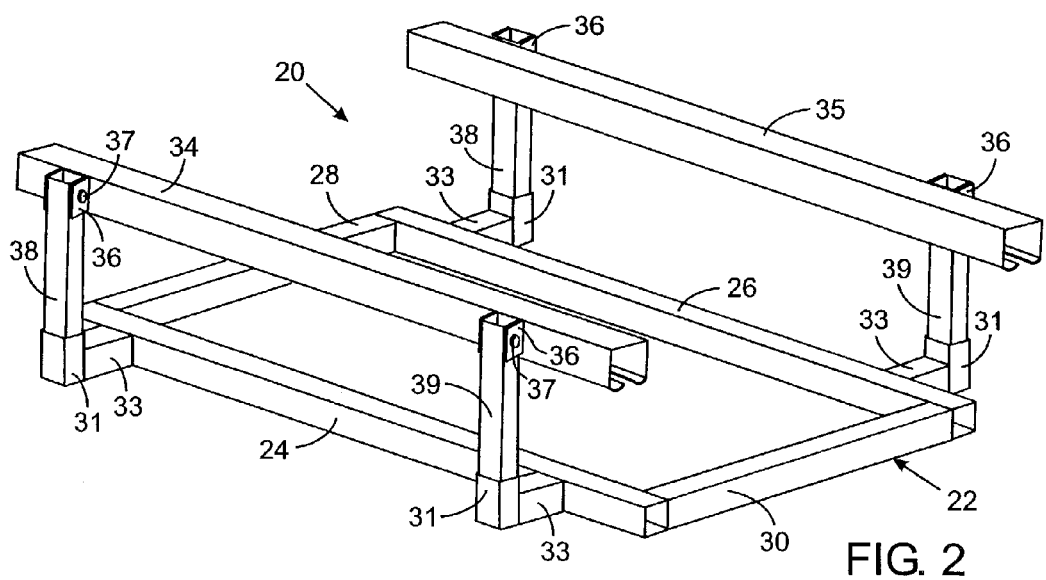
FIG. 2 is a perspective view of a main frame of the load lifting apparatus, which has been removed from the motor vehicle.

With initial reference to FIGS. 1 and 2, the present load lifting apparatus 10 is installed on a pickup truck 12 which has a cargo bed 14 formed by a front wall 16 and spaced apart side walls 17 and 18 with a floor 19 there between. Although the present invention is being described in the context of use on a pickup truck, it can be employed with other types of motor vehicles and trailers, generically referred to herein as a "vehicle". A main frame 20 of the load lifting apparatus 10 is located within the cargo bed 14 and is secured therein using conventional tie-downs (not visible) that engage hooks provided on the interior surfaces of side walls 17 and 18. The main frame 20 includes a base frame 22 resting on the bed floor 19 and comprising a pair of longitudinal rails 24 and 26 which extend parallel to and spaced from the side walls 17 and 18 just inside the rear wheel wells 15 of the vehicle 12. A first transverse rail 28 is connected between the two longitudinal rails 24 and 26 adjacent the front wall 16 and a second transverse rail 30 extends between the two longitudinal rails 24 and 26 adjacent the vehicle's tailgate 32. The four rails 24–30 preferably comprise square metal tubes that are welded together.

The main frame 20 also has a pair of vertical supports 38 and 39 extending upward from the ends of the first and second transverse rails 28 and 30 that extend laterally beyond the longitudinal rails 24 and 26. Preferably vertical supports 38 and 39 removably fit into sockets 31 at the ends of members 33 that project laterally outward from the longitudinal rails 24 and 26. Alternatively the vertical supports 38 and 39 can be welded to the lateral members 33. A primary track 34 or 35 is attached to the upper end of each pair of vertical supports 38 and 39, so as to be parallel to the adjacent side wall 17 or 18 and flush with or slightly below the tops of that wall. This spatial relationship ensures that the main frame 20 fits within a cargo bed 14 which is enclosed by a truck cap or cover. The primary tracks 34 and 35 are connected to the respective vertical support 38 or 39 by a socket or U-shaped bracket 36 that is welded to the track and secured to the vertical support by a pin or bolt 37. This connection allows the tracks to be removed from the vertical supports which facilitates installation and removal of the main frame 20 from the cargo bed 14 of the motor vehicle 12.

Figure 3:
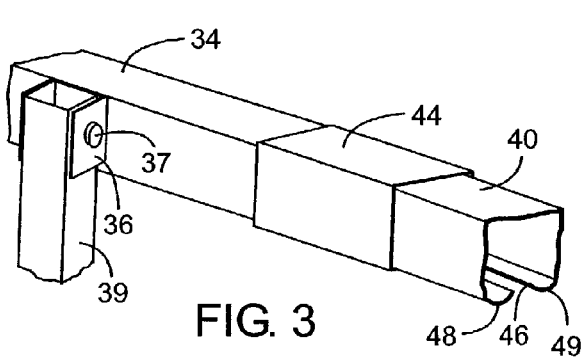
FIG. 3 is an enlarged fragmented view of the connection between two sections of a track of the load lifting apparatus.

With reference to FIGS. 1 and 3, when it is desired to load or unload the motor vehicle 12, the load lifting apparatus 10 is placed into an operational position in which a pair of extension tracks 40 and 42 are attached to the rear ends of the primary tracks 34 and 35 of the main frame 20 by means of couplings 44 and 46. When coupled in this manner, each extension track is aligned with the respective primary track. Each track coupling 44 and 46 is a sleeve which slightly larger than the outer dimensions of the two tracks being joined, as seen with respect to coupling 44 and primary tracks 34 and 40 shown in detail in FIG. 3. The coupling 44 is welded to one of the tracks, preferably the extension tracks 40, and slips over the other track to align the two tracks for use in the illustrated operational position. A vertical support leg 41 or 43 extends downward from the remote end of the respective extension track 40 or 42 to the ground. A cross member 45 connects the lower ends of the support legs 41 and 43 to prevent lateral movement. The support legs 41 and 43 preferably are hinged to the cross member 45 so that the assembly can be folder for storage in the cargo bed.

The tracks 34, 35, 40 and 42 are of the same type as used to support sliding doors being formed from a square or rectangular cross-section tube with a central longitudinal slot 46 in the bottom side as illustrated for extension track 40 in FIG. 3. The bottom side of the coupling 44 has a similar slot. The longitudinal slot 46 is defined in the tracks by two internally concave bottom walls 48 and 49, that form a pair of grooves in which a wheeled hanger travels inside the tracks.

Figure 4:
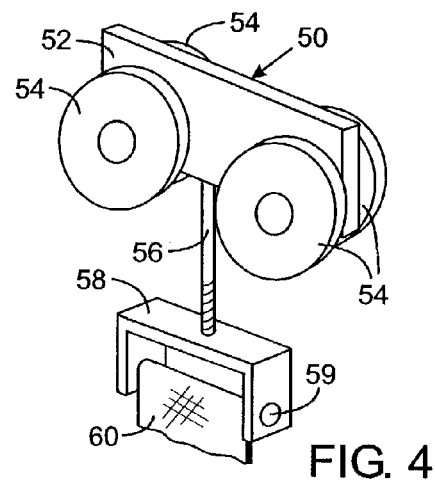
FIG. 4 is a perspective view of a hanger which travels within the tracks of FIG. 3.

FIG. 4 illustrates one of the wheeled hangers 50 which comprises a bar 52 to which four wheels 54 are attached by a pair of axles extending through apertures in the bar. The wheels and bar are received within the two extension tracks 40 and 42 in FIG. 2 with the wheels riding in the grooves formed by concave walls 48 and 49. A threaded rod 56 extends downwardly from the bar 52, passing through the slot 46 in the extension tracks 40 and 42. An inverted U-shaped bracket 58 is attached to the lower end of the threaded rod 56 and has a pin 59 extending between its downwardly projecting legs. The pin 59 passes through a loop at one end of a tie, such as a woven fabric belt 60.

With reference specifically to FIG. 2, two such hangers 50 are received within each extension track 40 and 42 with the associated bracket 58 located beneath the respective track. The woven fabric belts 60 extend downward to a load platform 62. The load platform 62 has a rectangular shape which is sized to permit vertical movement between the vehicle tailgate 32 and the vertical support legs 41 and 43, as will be described. With additional reference to FIG. 5, the load platform 62 has a rectangular frame 61 formed by four metal outer members 63, 64, 65, and 66, which are welded together. Three metal transverse members 67, 68 and 69 extend within the frame between outer members 63 and 65 to provide additional support for the load being carried. A flat metal plate 71, shown in FIG. 1, is attached on top of the frame 61 to provide a surface on which to place the objects being lifted to and from the vehicle 12.

Figure 5:
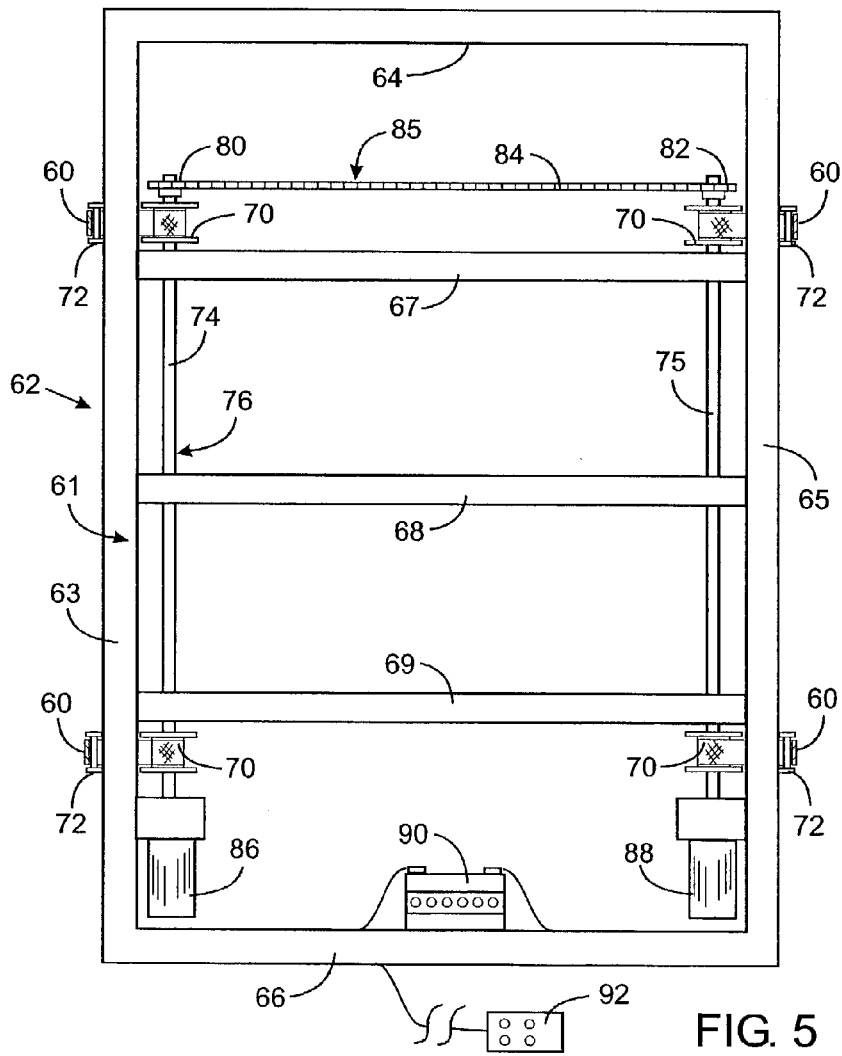
FIG. 5 is a top view of the load platform of the load lifting apparatus with the top plate removed.

With continuing reference to FIG. 5, each belt 60 passes over a separate pulley 72 attached to the outside vertical surface of outer member 63 or 65 and through an aperture in the respective member. The belt 60 then winds onto one of four reels 70 within the frame 71. The two reels 70, that are adjacent outer member 63, are fixedly attached to a first shaft 74 which is parallel to that frame member, The first shaft 74 extends through apertures in the transverse frame members 67, 68 and 69 and are supported by bearings attached to those latter members. Similarly, the other two reels 70, adjacent the opposite outer member 65, are fixedly attached to a second shaft 75 extending parallel to that member. The second shaft 75 also extends through apertures in the transverse frame members 67, 68 and 69 being supported by bearings mounted thereon. A pair of sprockets 80 and 82 are respectively attached to ends of the two shafts 74 and 75 and a chain 84 is connected between those sprockets to form a mechanical linkage 85 that rotationally couples the two shafts. Other kinds of mechanical linkages, such as a transverse shaft and bevel gears, can be used in place of the sprockets 80 and 82 and chain 84 to couple the two shafts 74 and 75. The two shafts 74 and 75 and the mechanical linkage 85 comprise a transmission 76 for rotating the four reels 70. Alternative transmissions may be employed to rotate the reels in other forms of the powered platform 62 of the present invention.

A separate 12 volt, direct current electric motor 86 or 88 is coupled to the opposite end of each shaft 74 or 75, respectively, to rotate the associated shaft. The polarity of the direct current applied to the electric motors 86 and 88 determines the direction in which the shafts 74 and 75 are driven. One polarity is used to wind the belts 60 onto the reels 70 and the opposite polarity is employed to unwind the belts. When the platform 62 is attached to the motor vehicle 12, a connection to the vehicle's electrical system provides power for the motors. A 12 volt battery 90 is mounted on a bracket attached to frame member 66 to furnish power when the platform 62 is used off the vehicle with a free-standing frame, as will be described. The detachable connection to the electrical system of the motor vehicle 12 also can be used to recharge the platform battery 90. The battery 90 and the electric motors 86 and 88 are connected to a hand-held control unit 92, which enables the user to activate the two motors 86 and 88 in unison and select the direction that the motors are to rotate. Alternatively a single electric motor may be employed to drive the shafts 74 and 75. As a further alternative, another type of a prime mover, such as a hydraulic motor or an internal combustion engine, can be substituted for the electric motors.

Rotation of the first and second shafts 74 and 75 in one direction causes the woven fabric belts 60 to wind onto the four reels 70. The belts 60 on one side of the frame 61 are wound in the opposite direction around the reels 70 from the belts on the other side of the frame so that the rotation of the shafts 74 and 75 in one direction winds all the belts onto the reels. This action raises the load platform 62 toward the extension tracks 40 and 42, as shown in FIG. 2. Any of several kinds of other flexible ties may be substituted for the woven fabric belt 60. For example, a rope, cable, wire rope, chain, woven fabric belt, other type of a belt, and the like may be used and are generically referred to herein as a "tie" or as "ties."

When the load platform 62 is raised above the height of the tailgate 32 and the base frame 22 inside the cargo bed 14, the user pushes the load platform toward the truck 12. This motion of the load platform is transferred upward by the belts 60, thereby causing the hangers 50 to travel within the extension tracks 40 and 42 toward the truck. Alternatively a winch can be provided to move the load platform horizontally. The user continues to move the load platform 62 along the extension tracks 40 and 42 and onto the primary tracks 34 and 35 of the main frame 20. This movement continues until the load platform 62 is entirely within the cargo bed 14 of the motor vehicle 12. At that point, the user activates the motors 86 and 88 to unwind the belts 60 from the reels 70, lowering the load platform 62 and any object thereon onto the base frame 22 resting on the cargo bed floor 19.

After the load platform 62 has been positioned within the cargo bed 14, the user removes the extension tracks 40 and 42 from the primary tracks 34 and 35 and detaches the support legs 41 and 43 and the cross member 45. Each of these components then can be stored within the cargo bed 14. The tailgate 32 then is raised and locked, completing the loading process.

To unload the vehicle, the reverse of the loading process is carried out. Specifically, the user assembles the extension tracks 40 and 42, the support legs 41 and 43 and the cross-support 45. That assembly is attached to the rear ends of the primary tracks 34 and 35. With the tailgate 32 lowered, the user activates the motors 86 and 88 to raise the load platform 62 slightly above the base frame 22. Then the user pushes the load platform 62 out the rear opening of the cargo bed 14. This motion causes the hangers 50 to travel within the main channels 34 and 35 into the extension tracks 40 and 42. When the load platform 62 is entirely beyond the tailgate 32, the user activates the motors 86 and 88 to unwind the belts 60 from their respective reels 70, thereby lowering the load platform and any object thereon to the ground. The object then can be moved off of the load platform which is a relatively small distance above the ground as compared to the cargo bed 14 of the motor vehicle. After the object has been removed, the load platform 62 can be raised and placed back into the cargo bed 14, and the various components disassembled and stowed in the motor vehicle 12.

Alternatively, the load platform 62 can remain on the ground and disconnected from the remainder of the load lifting apparatus 10. Specifically, the motors 86 and 88 can be operated to slacken the belts 60, thereby enabling the extension tracks 40 and 42 to be removed from the main frame 20 within the truck. The extension tracks can be placed along side the load platform 62 and the respective belts then wound up onto the reels 70. Otherwise, the hangers 50 can be slid out of an open end of the extension tracks 40 and 42 before the belts are wound onto the reels.

Figure 6:
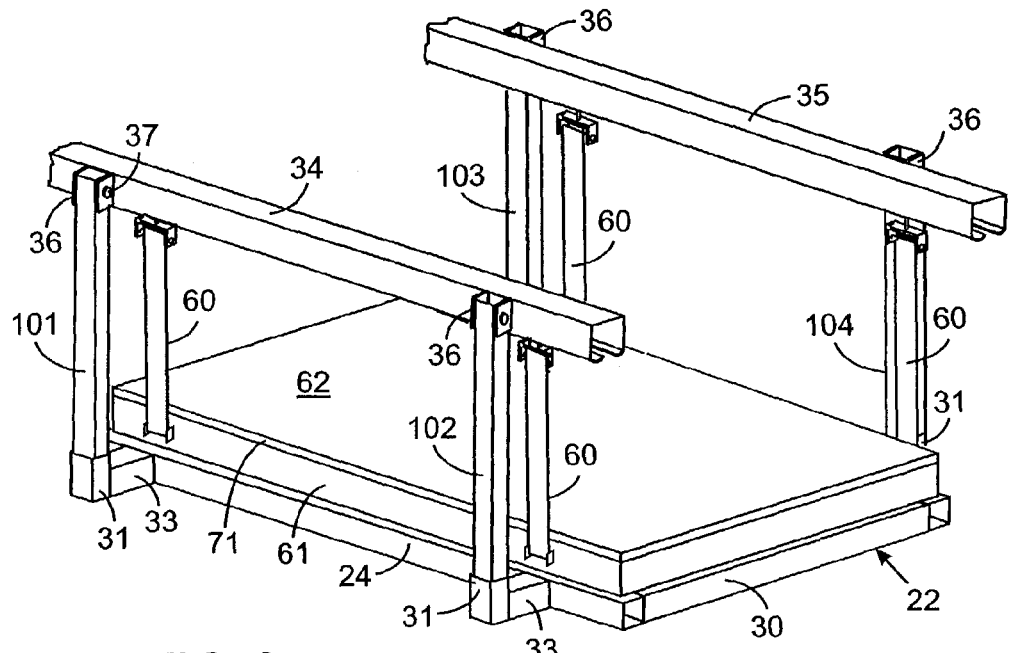
FIG. 6 is a perspective view of the load platform connected to a free standing support frame for use detached from a motor vehicle.

Referring to FIG. 6, the load platform 62 also can be used with a free standing frame 100. The free-standing frame 100 has a base frame 22 located on the ground or a building floor. The base frame 22 is identical to the base frame placed in the load bed of the motor vehicle and previously described. However, four vertical legs 101, 102, 103 and 104 are inserted into the sockets 31 of the base frame and extend upward higher than the vertical supports 38 and 39 for the motor vehicle. The longer length of the four vertical legs 101–104 enables the platform 62 to be raised higher from the ground or the building floor. Sets of four vertical legs with different lengths can be provided for various applications of the free standing frame 100. This provides a sturdy free standing frame 100 remote from the vehicle 12 on which the two extension tracks 40 and 42 can be mounted. Fittings are provided so that the members of the free standing frame 100 can be detached from each other for compact storage when not in use.

The motors 86 and 88 are operated to raise and lower the load platform 62 within the free standing frame 100. For example, the load lifting apparatus can be utilized to raise an object to a suitable height for a person to work on that object, or to raise a load to a height of an adjacent surface onto which the object will be transferred.

Figure 7:
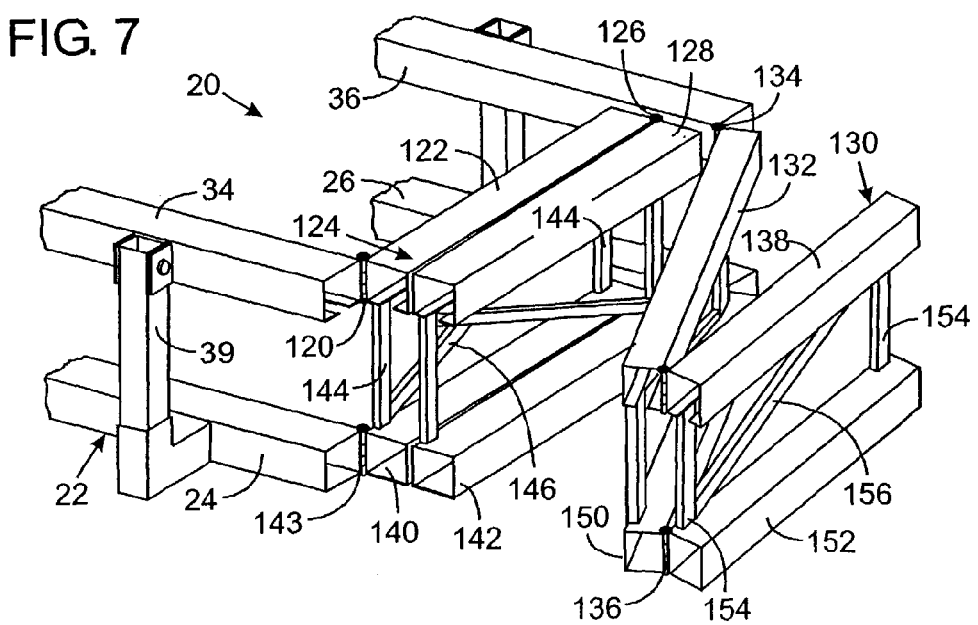
FIG. 7 is a perspective view of an alternative connection between different sections of a track of the load lifting apparatus.

FIG. 7 illustrates an alternative manner in which the tracks of the lifting apparatus are extended beyond the back of the truck. This alternative configuration is particularly useful for smaller vehicles, such as vans and sport utility vehicles, which carry lighter loads. It should be understood the configuration of the lifting apparatus may vary from that illustrated for the pickup truck in order to fit inside these other vehicles. In this alternative configuration, each extension track is divided into two sections that are hinged together and in turn hinged to the rear end of the primary track of the main frame 20. Specifically, a first hinge 120 couples the rear end of the first primary track 34 on the main frame 20 to the proximate end of a first section 122 for the first extension track 124. The remote end of the first extension track section 122 has a second hinge attached thereto and to a second section 128 of the first extension track 124. Similarly a first pair of hinged frame extension rails 140 and 142 are attached by a hinge 139 to the rear end of longitudinal rail 24 of the base frame 22. The proximate extension rail 140 is connected by two vertical members 144 and a diagonal member 146 to the first extension track section 122 to form a truss for supporting the first extension track 124 when cantilevered from the main frame 22. In a similar manner, the remote extension rail 142 is connected by another set of two vertical members and a diagonal member to the second extension track section 128 to continue the truss for the first extension track 124. The first extension track 124 is shown in the stowed position in which its two sections 122 and 124 are folded against one another and positioned orthogonal to the first primary track 34 of the main frame 20. Likewise the frame extension rails 140 and 142 are folded against the base frame 22. In this stowed position the first extension track 124 is parallel to the tailgate 32. It should be understood that the rear ends of the two primary tracks 34 and 35 of the main frame 20 must be spaced from the interior surface of the tailgate 32 when closed so as to accommodate the folded extension tracks 124 and 130.

The rear end of the second primary track 35 of the main frame 20 extends beyond the rear end of the first primary track 34 by an amount sufficient to clear the folded first extension track 124. This allows the second extension track 130 to be folded against and behind the first extension track. Specifically, the rear end of the second primary track 35 is coupled to a first section 132 of the second extension track 130 by a third hinge 134. The opposite end of that first section 132 is connected by another hinge 135 to a second section 138 of the second extension track 130. Each section 122, 128, 132 and 138 of the extension tracks 124 and 130 has a cross-section identical to the primary tracks 34 and 35 so that the hangers 50 can travel therein. A second pair of hinged frame extension rails 150 and 152 are attached by a hinge to the rear end of longitudinal rail 26 of the main frame 22. The proximate extension rail 150 is connected by two vertical members and a diagonal member to the proximate extension track section 132 to form a truss that supports the second extension track 130 when cantilevered from the main frame 22. The remote extension rail 122 is connected by another pair of vertical members 154 and a diagonal member 156 to the second extension track section 138 to continue the truss for the first extension track 130.

In order to load or unload the motor vehicle 12, the two extension tracks 124 and 130 and associated extension rails are unfolded into alignment with the associated primary track 34 or 35. In a van or other vehicle which carries relatively light loads, the truss supporting the track extensions 124 and 130 eliminates the need for the support legs 41 and 43 at the remote ends of the track extensions as in FIG. 1. However, those support legs may be provided in order to lift heavier objects.

Figure 8:
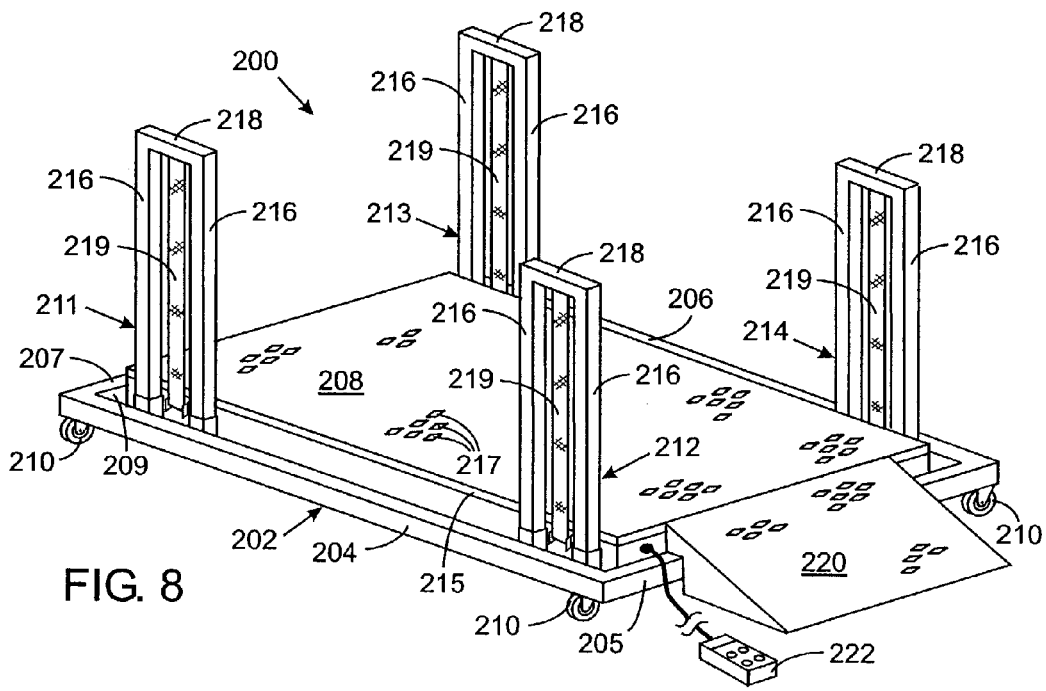
FIG. 8 is a perspective view of another embodiment of a free standing support frame with a load platform a lowered state.

With reference to FIG. 8, a second embodiment of a lifting apparatus 200 according to the present invention is intended solely for free-standing use without having a frame that mounts in the bed of a motor vehicle. The second lifting apparatus 200 can be used to raise and lower objects to the height of the motor vehicle bed for loading and unloading and can be used to raise an object to a convenient working height for a technician to perform repairs and maintenance on the object.

The second lifting apparatus 200 has a base frame 202 formed by four rails 204, 205, 206, and 207 connected at right angles to form a rectangle with a central opening 209. The central opening of the base frame 202 is large enough to receive the load platform 208 which in the fully lowered state is able to rest on the ground or floor beneath the lifting apparatus. Four swivel caster wheels 210 are mounted adjacent the corners of the base frame 202 and additional swivel caster wheels may be provided to increase the load carrying capability. Retractable legs (not shown) may be provided to engage the floor to carry the weight of the load being lifted after the apparatus has been properly positioned. Although the wheels 210 enable the second lifting apparatus 200 to be moved with or without a load, the wheels may be eliminated and the base frame 202 positioned directly on the floor in installations where movement is not required.

Four vertical lift posts 211, 212, 213, and 214 are attached to the base frame 202. Two of the lift posts 211 and 212 are attached to a rail 204 on one side of the base frame while the other two lift posts 213 and 214 are attached to the opposite base frame rail 206. Each lift post 210–214 comprises a pair of spaced apart vertical members 216 with a cross member 218 extending between their upper ends. The lift posts 210–214, specifically the vertical members 216, may be fixedly attached, such as by welds, to the base frame or may be received in sockets the base frame 202 which allows the lift posts to be detached for compact storage of the second lifting apparatus 200.

The load platform 208 has the same construction as load platform 62 shown in FIG. 5 and described previously with respect to the other embodiments of the present lifting apparatus. The top plate 215 preferably is a sheet of commercially available diamond plate that has rows of diamond shaped bumps 217 on the upper surface to improve traction of objects being loaded onto and unloaded from the load platform 208. The four woven fabric belts 219, that pass through the apertures in the outer member of the load platform 208, extend upward and are secured to the cross member 218 of a different lift post 211–214. The fabric belts 219 are but one type of flexible ties which can be used and other kinds of flexible ties such as ropes, cables, wire ropes, chains, and other types of a belts also may be used.

Figure 9:
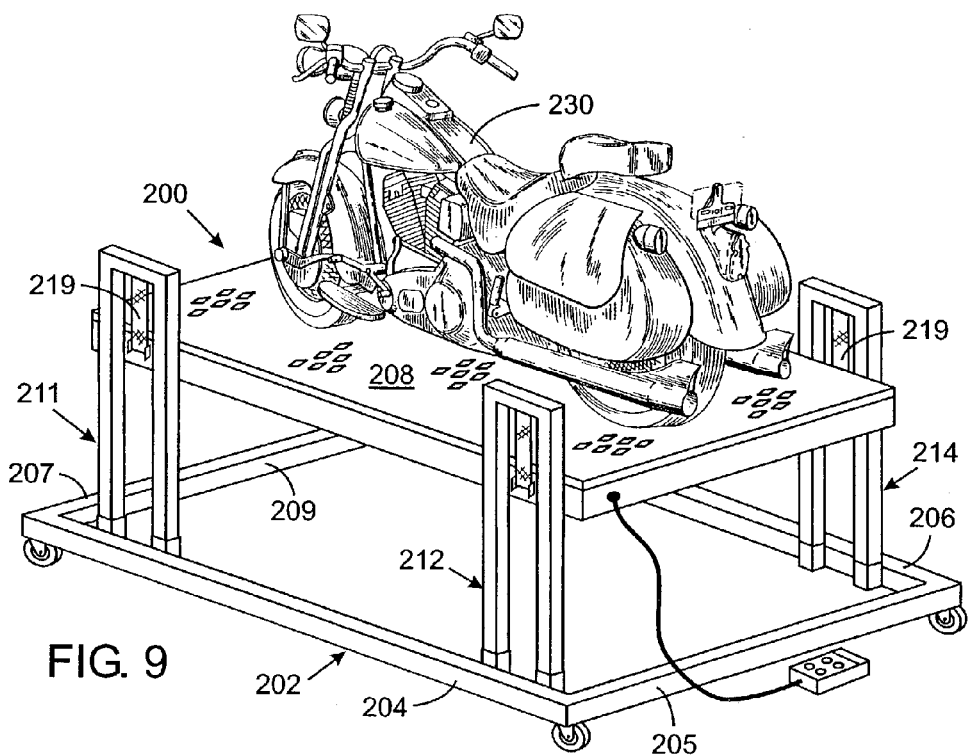
FIG. 9 is a perspective view of the load platform raised with respect to the free standing support frame.

FIG. 8 illustrates the second lifting apparatus 200 in a lowered state where the load platform 208 is resting on the floor. This state allows objects to be conveniently transferred from the floor onto the load platform 208. If necessary a ramp 220 can be provided to aid in transferring the objects to and from the load platform, such as by using a hand truck. After all the object have been placed onto the load platform 208, the user operates the hand-held control unit 222 to turn on the motors 86 and 88 in the load platform. As with the previous embodiments, activation of the motors causes the belts 219 to wind onto the reels 70 thereby raising the load platform as illustrated in FIG. 9.

With the load platform 208 raised off the floor the entire lifting apparatus 200 and the objects thereon can be moved to another location. For example, the lifting apparatus 200 can be used to transport goods in a warehouse or a shop from a storage location to a vehicle loading area where the load platform 208 raised can be raised to the height of the cargo bed of a motor vehicle so that the objects can be readily transferred into the motor vehicle. Specifically the lifting apparatus 200 can be used to raise a motorcycle 230, as shown on FIG. 9, to the height of the bed of a pickup truck and the motorcycle can be rolled from the load platform 208 onto the truck bed. Another use for the lifting apparatus 200 is to provide a work surface for raising a workpiece, such as the motorcycle 230, to a height that is convenient for a mechanic to perform repairs and maintenance.

To lower the load platform 208, the user activates the motors 86 and 88 to unwind the belts 219 from their respective reels 70, thereby lowering the load platform and any object thereon to the ground.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An apparatus for lifting a load with respect to a surface, the apparatus comprising:
    a base frame having elements which engage the surface and form an opening;
    a plurality of lift posts removably attached to and extending upward from the base frame; and
    a load platform for supporting an object being lifted and in a lowered state being received within the opening of the base frame, the load platform comprising a motor arrangement, a plurality of reels, a transmission connecting the motor arrangement to the plurality of reels, and a plurality of flexible ties each connected to one of the plurality of lift posts and wound onto one of the plurality of reels, wherein winding and unwinding the plurality of flexible ties onto and off of the plurality of reels respectively raises and lowers the load platform with respect to the surface.

2. The apparatus as recited in claim 1 wherein the transmission comprises:
    a first shaft and a second shaft on which the plurality of reels are mounted, wherein the motor arrangement is coupled to the first shaft; and
    a mechanical linkage rotationally coupling the first shaft and the second shaft.

3. The apparatus recited in claim 2 wherein the mechanical linkage comprises:
   a first sprocket attached to the first shaft;
   a second sprocket attached to the second shaft; and
   a chain engaging the pair of sprockets.

4. The apparatus as recited in claim 2 wherein the motor arrangement comprises:
   a first electric motor connected to the first shaft; and
   a second electric motor connected to the second shaft.

5. The apparatus as recited in claim 1 wherein the motor arrangement comprises an electric motor.

6. The apparatus as recited in claim 1 wherein the plurality of flexible ties are selected from the group consisting of belts, woven fabric belts, chains, ropes, cables, and wire ropes.

7. The apparatus as recited in claim 1 wherein the plurality of lift posts are received in sockets attached to the base frame.

8. The apparatus as recited in claim 1 wherein the base frame comprises four rails connected to form a rectangle with the opening formed between the four rails.

9. The apparatus as recited in claim 8 wherein the plurality of lift posts comprise two lift posts attached to one of the four rails and two other lift posts attached to another one of the four rails.

10. The apparatus as recited in claim 1 wherein elements of the base frame which engage the surface comprise wheels.

11. The apparatus as recited in claim 1 wherein the load platform comprises a plate for placement of the object thereon, and wherein the motor arrangement, the plurality of reels and the transmission are located beneath the plate.

12. The apparatus as recited in claim 1 wherein the load platform comprises rectangular frame and a plate on top of the rectangular frame, and wherein the motor arrangement, plurality of reels and the transmission are located within the frame and beneath the plate.

13. A load lifting apparatus comprising:
   a base frame having elements which engage a surface which supports the load lifting apparatus;
   a plurality of lift posts attached to and extending upward from the base frame; and
   a load platform for supporting an object being lifted, and having a first side and a second side, a first shaft extending along the first side, a second shaft extending along the second side, a plurality of reels attached to the first shaft and the second shaft, a motor arrangement coupled to at least one of the first shaft and the second shaft, and a plurality of flexible ties each connected to one of the plurality of lift posts and wound onto one of the plurality of reels, wherein winding and unwinding the plurality of flexible ties onto and off of the plurality of reels respectively raises and lowers the load platform with respect to the surface, and the load platform further comprises a plate for placement of the object thereon, wherein the first shaft, the second shaft, the plurality of reels, and the motor arrangement, are located beneath the plate.

14. The apparatus as recited in claim 13 wherein the motor arrangement comprises a first electric motor connected to the first shaft; and a second electric motor connected to the second shaft.

15. The apparatus as recited in claim 13 further comprising a mechanical linkage rotationally coupling the first shaft and the second shaft.

16. The apparatus as recited in claim 15 wherein the motor arrangement comprises an electric motor connected to the first shaft.

17. The apparatus as recited in claim 13 wherein the plurality of flexible ties are selected from the group consisting of belts, woven fabric belts, chains, ropes, cables, and wire ropes.

18. The apparatus as recited in claim 13 wherein the plurality of lift posts are removably attached to the base frame.

19. The apparatus as recited in claim 13 wherein the base frame comprises four rails connected to form a rectangle with a opening formed between the four rails; and the load platform in a lowered state is received within the opening.

20. The apparatus as recited in claim 13 wherein elements of the base frame which engage the surface comprise wheels.

21. The apparatus as recited in claim 13 wherein the load platform comprises rectangular frame and the plate is on top of the rectangular frame, and wherein the first shaft, the second shaft, the plurality of reels, and the motor arrangement, are located within the frame and beneath the plate.

* * * * *